United States Patent [19]

Schramm et al.

[11] Patent Number: 5,548,202

[45] Date of Patent: Aug. 20, 1996

[54] REGULATABLE ALTERNATING DEVICE WITH MEANS FOR DETERMINING FINAL TEMPERATURE

[75] Inventors: Günter Schramm, Vaihingen-Enzweihingen; Walter Kohl, Bietigheim; Friedhelm Meyer, Illingen; Rainer Mittag, Kornwestheim; Helmut Suelzle, Benningen, all of Germany

[73] Assignee: Robert Bosch GmbH, Stuttgart, Germany

[21] Appl. No.: 107,814

[22] PCT Filed: Nov. 26, 1992

[86] PCT No.: PCT/DE92/00985

§ 371 Date: Aug. 18, 1993

§ 102(e) Date: Aug. 18, 1993

[87] PCT Pub. No.: WO93/12568

PCT Pub. Date: Jun. 24, 1993

[30] Foreign Application Priority Data

Dec. 18, 1991 [DE] Germany .......................... 41 41 837.9

[51] Int. Cl.⁶ .................................................. H02J 7/14
[52] U.S. Cl. ................................. 322/33; 322/34
[58] Field of Search .................... 322/33; 320/35

[56] References Cited

U.S. PATENT DOCUMENTS

| | | | |
|---|---|---|---|
| 4,100,475 | 6/1978 | Gansert et al. | 320/35 |
| 4,450,389 | 5/1984 | Frister et al. | 318/140 |
| 5,079,716 | 7/1992 | Lenhardt et al. | 364/483 |
| 5,198,744 | 3/1993 | Kohl et al. | 322/33 |
| 5,309,083 | 5/1994 | Pierret et al. | 323/313 |
| 5,374,886 | 12/1994 | Kohl et al. | 322/28 |

FOREIGN PATENT DOCUMENTS

| | | |
|---|---|---|
| 0462503 | 12/1991 | European Pat. Off. . |
| 2550398 | 2/1985 | France . |
| 3142878 | 10/1981 | Germany . |
| 3843163 | 12/1988 | Germany . |
| 9007217 | 6/1990 | WIPO . |
| 9210019 | 11/1992 | WIPO . |

*Primary Examiner*—Steven L. Stephen
*Assistant Examiner*—Nicholas Ponomarenko
*Attorney, Agent, or Firm*—Michael J. Striker

[57] ABSTRACT

In a device and a method for regulating an alternator increased alternator output is achieved either in that the exciter current can have a value above the nominal exciter current or in that the alternator control parameters are fixed in such a way that overheating could occur under unfavorable circumstances. In order to prevent this overheating even under unfavorable circumstances, the temperature is measured preferably in the regulator and the temperature at critical locations is determined from this temperature while taking into account typical parameters. This can be effected in that the temperature or temperatures which would occur in stationary operation are first determined. When an impermissible temperature is detected, the exciter current is reduced by suitable steps until the allowable maximum temperature is not exceeded.

29 Claims, 4 Drawing Sheets

FIG. 7A
FIG. 7B
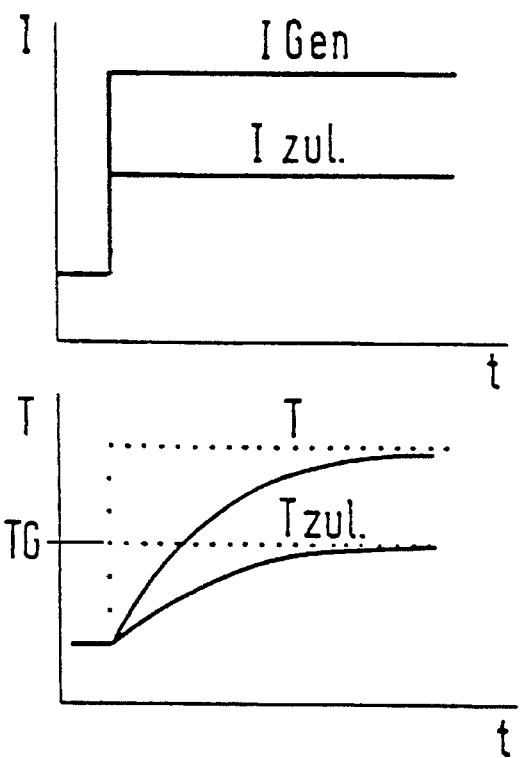
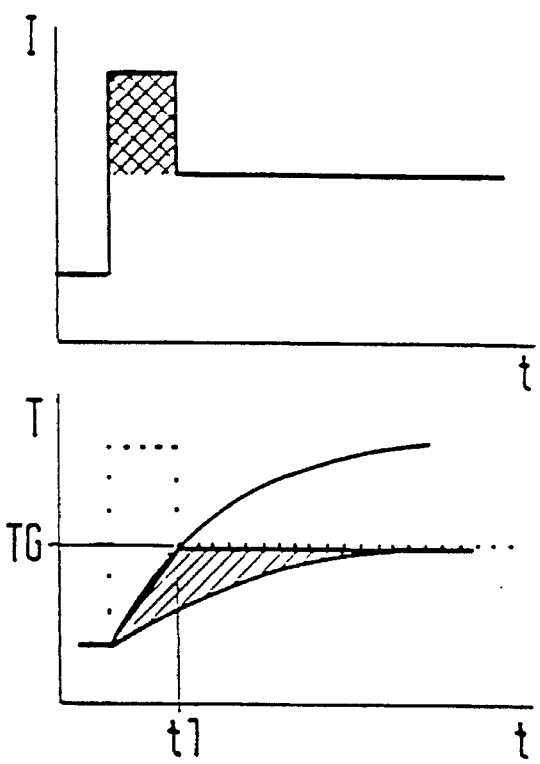
FIG. 7C
FIG. 7D
FIG. 8
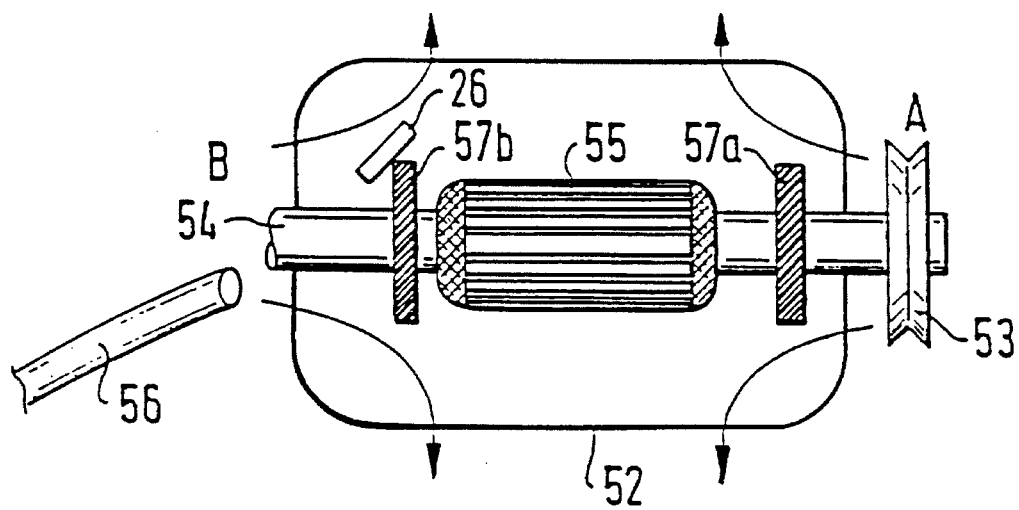

REGULATABLE ALTERNATING DEVICE WITH MEANS FOR DETERMINING FINAL TEMPERATURE

BACKGROUND OF THE INVENTION

The present invention relates to a device and a method for regulating an alternator according to the generic part of the main claim.

At present, three-phase alternators are predominantly used for supplying power in a motor vehicle. These alternators produce alternating voltage which is rectified in a rectifier arrangement downstream of the alternator and used for supplying the consumers and for charging the battery. Since the output voltage of the alternator depends to a considerable extent on the rate of rotation of the alternator, a voltage regulator is used for achieving a desired constant output voltage. The voltage regulator influences the exciter current of the alternator in such a way that the alternator output voltage maintains a constant value, e.g. 14 volts, in spite of substantial fluctuations in alternator speed.

Since the number of electrical consumers in the motor vehicle continues to grow steadily, the demands made on alternators continue to increase. Problems occur in the power supply particularly in winter when windshield heaters are switched on in addition to the other consumers or when the vehicle is operated over long periods of time exclusively in city traffic, that is, at lower speeds. For this reason, the attempt is made to increase the current delivery of three-phase alternators in such a way that the output of the alternator is increased while the voltage remains constant.

One possibility for increasing the alternator output is known from DE-OS 31 42 878. In this suggestion, the exciter winding is supplied with a voltage greater than the battery voltage. This increases the intensity of the exciter current so that a substantially greater magnetic field is generated which leads to an increase in the alternator output, all other alternator dimensions remaining the same. The maximum exciter current or maximum magnetic flux is determined by the thermal limiting values of the rectifier diodes or of the stator in the alternator. If the exciter winding is operated at a voltage which is greater than the vehicle supply voltage, as is described in DE-OS 31 42 878, there is a risk that the allowable thermal limiting values will be exceeded under unfavorable operating conditions.

To solve this problem it is suggested in DE-P 38 43 163 to increase the exciter current above the nominal exciter current under certain conditions in a three-phase alternator of a vehicle for optimal vehicle power supply. If the thermal limiting value is reached, this is promptly detected by temperature measurement means in the regulator due to the arrangement of the regulator on a structural component part of the alternator which becomes particularly hot. After this is detected, the exciter current is reduced until the thermal limiting value is not exceeded. However, DE-P 38 43 163 does not indicate how to effect the increase in the exciter current above the nominal regulator current.

The EP application 0 462 503, which is not a prior publication, is a further development of the application mentioned above. Its disclosure is repeated in the following description and essential points are elucidated.

SUMMARY OF THE INVENTION

Accordingly, it is an object of the present invention to provide a device and a method for regulating an alternator, which avoids the disadvantages of the prior art.

In keeping with these objects and with others which will become apparent hereinafter, one feature of the present invention resides, briefly stated, in a device and method for regulating an alternator with an exciter winding and a voltage regulator which regulates an output voltage of the alternator by influencing its exciter current and has means for detecting temperature, and the voltage regulator or additional means for influencing the exciter current reduce the exciter current at least when a limiting temperature or a limiting temperature range is reached, wherein in accordance with the present invention means is provided which determine a final temperature of at least one predetermined component of the device, which final temperature occurs in stationary operation, and also determine the temperature curve and/or the actual temperature of the component in question as a function of this temperature and compares it with the limiting temperature.

When the device is designed and method is performed in accordance with the present invention, they have the advantage compared with the known devices that the alternator can be operated in an overexcited range and in a thermally critical state when high output power is required and the alternator, rectifier diodes and voltage regulator are guarded against destruction due to overheating in that the temperature measurement is effected in the voltage regulator itself and by introducing safeguards if necessary.

As a result of the steps, according to the invention, for reducing the resistance of the exciter winding or the use of voltage increased above the vehicle supply voltage, it is possible to operate the alternator occasionally in the overexcited range in a simple manner.

In a further construction it is possible to design the device according to the invention in general in such a way that even when operating at nominal exciter current it would become impermissibly hot given a combination of unfavorable circumstances, e.g. particularly high outside temperatures in combination with a relatively low alternator speed and accordingly low cooling, and in order to prevent overheating in this case to provide it with a safety device which causes a reduction in the exciter current when an excessive temperature is detected or shortly before an excessive temperature is reached.

The required determination of temperature can be effected by measuring the temperature in the voltage regulator and by calculating the temperature of individual components of the device. It is particularly advantageous to utilize parameters or characteristic data typical of the alternator, regulator or vehicle for the calculation.

This procedure corresponds to the observer function, known in general from control technique, whereby an observer determines a measurement value which can be easily measured so that a different, less accessible measurement value can be determined from the determined measured quantity.

If the measured quantity determined by the observer is the temperature at the voltage regulator, the temperatures at other locations in the vehicle power supply can likewise be determined so that a reduction in the exciter current is carried out when one or more of the predetermined limiting temperatures is exceeded.

It is particularly advantageous to determine the temperature from calculated stationary final temperatures, that is, the temperature which would occur after a longer period of time if no further changes took place. The greatest possible number of measured values and parameters which are available in any case are advantageously taken into account in the calculation of these final temperatures and additional temperature gauges are not required, so that greater operating reliability is achieved and the entire arrangement is smaller, lighter and cheaper.

The prevailing momentary temperatures required for detecting when a limiting temperature is reached can be advantageously derived from the determined final temperatures. The temperature curves over time anticipated at different locations can also be determined. It is possible to choose from a variety of possibilities relating to the heating of a temperature-dependent resistor and the resulting changes in resistance, the heating of a semiconductor junction, or the use of different thermal couplings.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 7 shows examples for the curve of the current and temperature plotted over time. Finally, FIG. 8 is a diagrammatic view of the interior of an alternator with varied air circulation.

DESCRIPTION OF PREFERRED EMBODIMENTS

Figure 1:
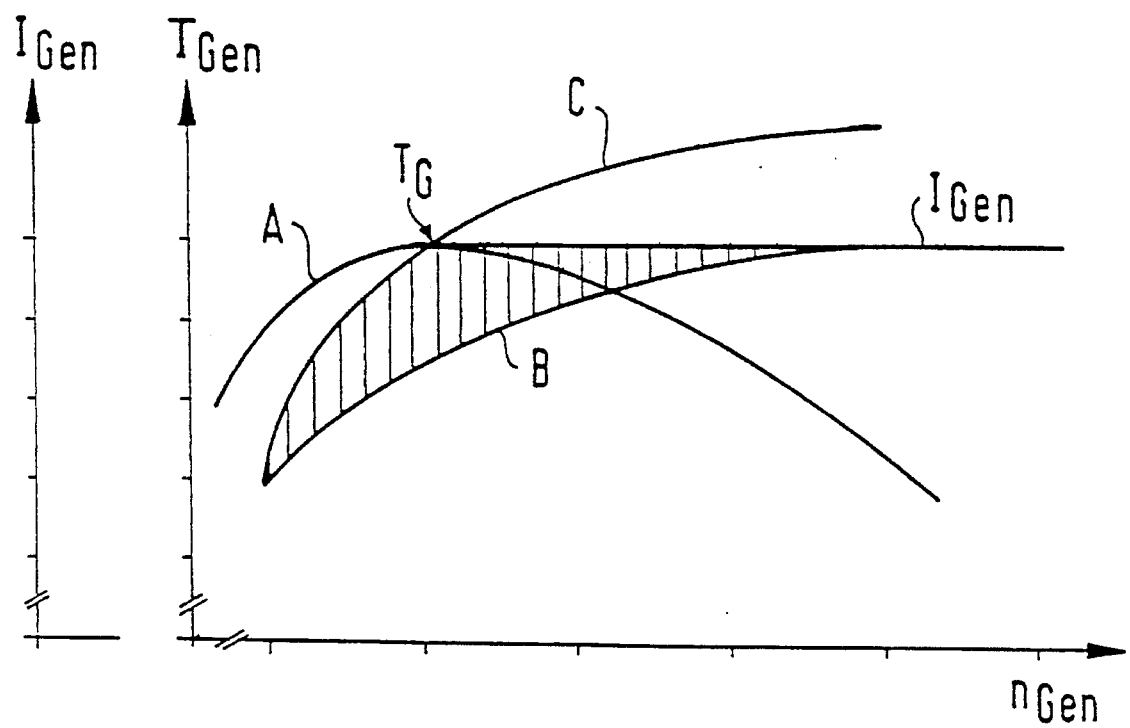
FIG. 1 shows the relationship between the alternator temperature and the alternator speed and between the alternator current and speed for two different exciter windings respectively.

In FIG. 1, curve A shows the alternator temperature $T_{Gen.}$ over the alternator speed $n_{Gen}$. The maximum temperature is dependent on the speed, the alternator load and the ambient temperature. The highest temperature normally occurs at relatively low alternator speeds, since the cooling output increases at higher speeds.

The alternator is normally designed in such a way that a maximum allowed temperature is not exceeded even under unfavorable circumstances. For this reason, it is necessary that the resistance of the exciter winding be high enough, normally approximately 2.6, so that the exciter current will ensure that the thermal limiting value of the alternator is not exceeded when the vehicle supply voltage is applied.

Curve B shows the alternator current $I_{Gen}$ over the alternator speed $n_{Gen}$ for an exciter winding whose resistance is adapted in such a way that the maximum allowed alternator temperature is not exceeded.

Curve C shows the alternator current over the alternator speed for an exciter winding whose resistance is less than in B, e.g. 2.0. When using an exciter winding with such a resistance, the alternator temperature would assume an excessively high value under unfavorable circumstances. Therefore, suitable steps must be taken so as to prevent this.

If an exciter winding with reduced resistance is used, the current must be limited by this exciter winding when there is a risk that the thermal limiting value of the alternator will be exceeded, i.e. when the measured temperature reaches the permissible limiting value. Particularly at low outside temperatures, an increased alternator current $I_{Gen}$ or output can be maintained until the limiting temperature $T_G$ is reached. The additional alternator current is shown by the shaded area.

Figure 2:
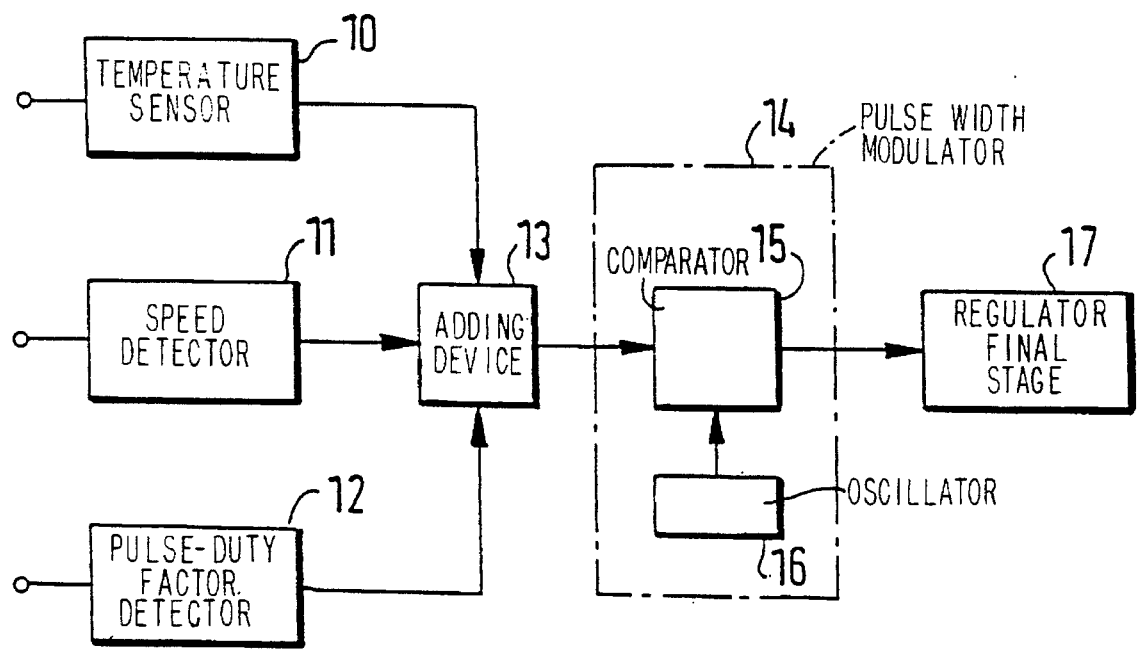
FIG. 2 shows a device according to the invention which ensures that the exciter current is reduced when the thermal limiting value is reached.

FIG. 2 shows a device which can influence the exciter current in this way. A sensor for measuring the regulator or alternator temperature is designated by 10. The temperature of the regulator is preferably measured by the sensor 10. The temperature can be determined in the regulator itself, since the regulator temperature does not change in the stabilized state by self-heating. For the rest, the regulator temperature represents a measurement for the outside temperature. A device for measuring the alternator speed is designated by 11 and a device for determining the pulse-duty factor is designated by 12. Pulse-duty factor refers to the on/off ratio of the final stage of the regulator. This pulse-duty factor is measured at the regulator terminal DF.

An adding device in which the signals supplied by the temperature sensor 10, by the device 11 for detecting speed, and by the device for determining the pulse-duty factor 12 are combined in a suitable manner is designated by 13. The alternator current can be determined from the alternator speed and the pulse-duty factor of the final stage of the regulator via appropriate characteristics. The sum signal obtained in this way is fed to a pulse width modulation stage 14 which includes a comparator 15 and an oscillator 16. In the pulse width modulation stage 14, a modulated signal is generated which is fed to the final stage 17 of the regulator and accordingly influences the pulse-duty factor of the final stage of the regulator and the exciter current $I_{Err}$.

It is important that the device shown in FIG. 2 influences the regulator only above a predetermined critical temperature, since it is only then that the sum signal supplied to the comparator 15 exceeds a predetermined threshold value. When the critical temperature is reached, the final stage of the regulator is influenced by the modulated signal generated in the pulse width modulation stage 14 in such a way that another increase in temperature due to an increased exciter current is prevented, i.e. the exciter current is reduced by more frequent blocking of the final stage of the regulator.

Figure 3:
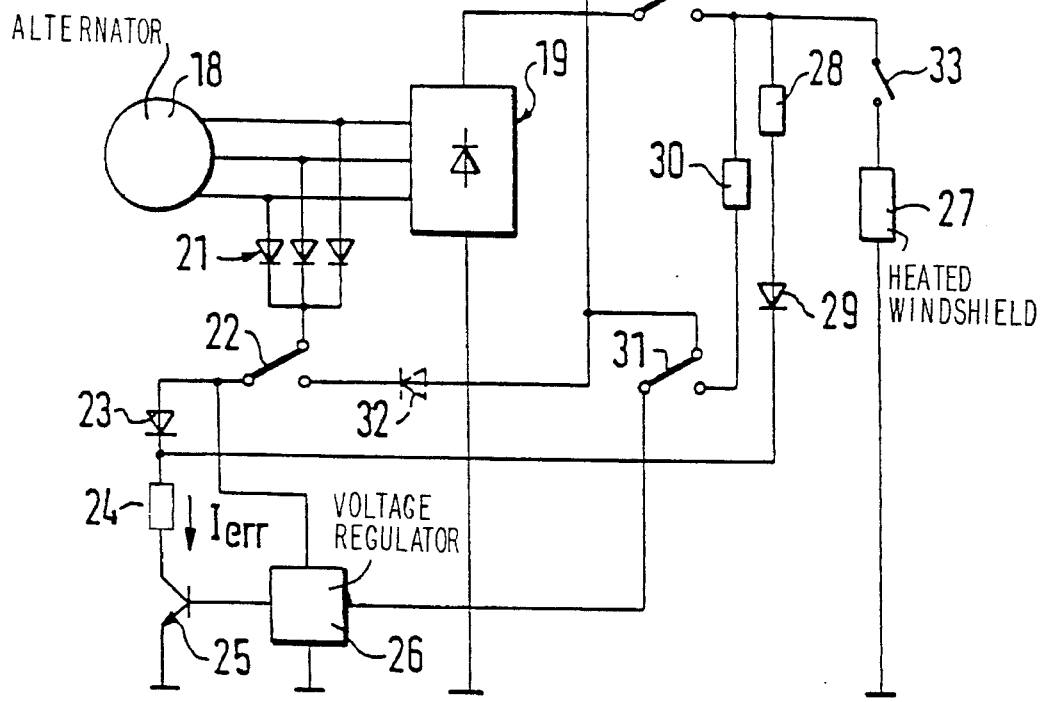
FIGS. 3 and 4 show two circuit examples which ensure that the exciter winding is supplied with a voltage which is increased over the vehicle supply voltage.

In the embodiment example shown in FIG. 3, the increase in the exciter current is achieved in that a higher voltage is applied to the exciter windings at least for a certain period of time. This higher voltage is generated in that the alternator is operated with freewheeling voltage, e.g. when briefly operating an electrically heated windshield. The higher voltage occurring at the alternator terminal B+ during operation with freewheeling voltage is fed directly to the exciter winding via a suitable circuit arrangement.

The circuit arrangement according to FIG. 3 shows in particular: an alternator 18 which is connected to ground via the rectifier bridge 19 on one side and on the other side, via a terminal B+, with a conventional vehicle supply system with consumers, not shown, and with a battery, also not shown. The connection between B+ and the consumers is effected via a switch 20.

The alternator 18 is also connected with the exciter winding 24 via an exciter rectifier 21 and an additional switch 22 as well as a diode 23. The exciter winding 24 is connected to ground in turn via the final stage transistor 25 of the voltage regulator 26. An additional connection of the voltage regulator 26 is connected with the exciter current rectifiers 21 via switches 22.

An electric heated windshield is designated by 27. This heated windshield can be connected to terminal B+ via the switch 20. An additional current path leads via the resistor 28 and the diode 29 to the exciter winding 24. This current path can likewise be connected via the switch 20 and the terminal B+. Finally, another path leads via the resistor 30 and via another switch 31 to the regulator 26. The same connection of the regulator 26 can be connected in the other switch position of the switch 21 with the vehicle supply system and, via another diode 32, with the switch 22. The anode of the diode 32 is connected directly with the vehicle supply system.

In normal operation when the standard vehicle supply voltage of 12 V is applied to the exciter winding, the switch position is the same as that shown in FIG. 3. In so doing, the vehicle supply system is supplied via the switch 20, the exciter current $I_{Err}$ of the exciter winding 24 is supplied via the switch 22, and the voltage regulator 26 is connected with the vehicle power supply via switch 31. On the other hand, when switching over to increased output the terminal B+ is connected via the switch 20 with the resistors 28 and 30 and with the heated windshield 27. The regulator 26 is connected with B+ via the reversed switch 31. The exciter winding 24 is likewise connected to B+ via the resistor 28 and the diode 29. The rectifier bridge 21 is disconnected from the exciter winding 24 by the switch 22.

In this switching state, the alternator 18 is operated with freewheeling voltage. Therefore, a voltage which is higher than the vehicle supply voltage occurs at the terminal B+. This higher voltage is connected to the exciter 24 via the resistor 28 and the diode 29. Since the alternator could become too hot in this operating state, it must be ensured either that this operating state can persist only for a relatively brief period of several minutes or that a circuit arrangement similar to the circuit arrangement known from FIG. 2 limits the exciter current when the temperature of the regulator or alternator becomes too high. A time switch or the circuit arrangement for limiting the exciter current is preferably contained in the voltage regulator 26.

The increased output requirement normally only persists during the heating phase in the heated windshield 27. However, the heated windshield 27 can be disconnected via another switch 33 so as to enable operation at increased output with freewheeling voltage without switching on the heated windshield 27.

The diode 32 can be dispensed with in this location if the entire portion of the supply system is designed for higher voltages, e.g. 20 volts. In this case, it can be arranged outside the alternator.

Figure 4:
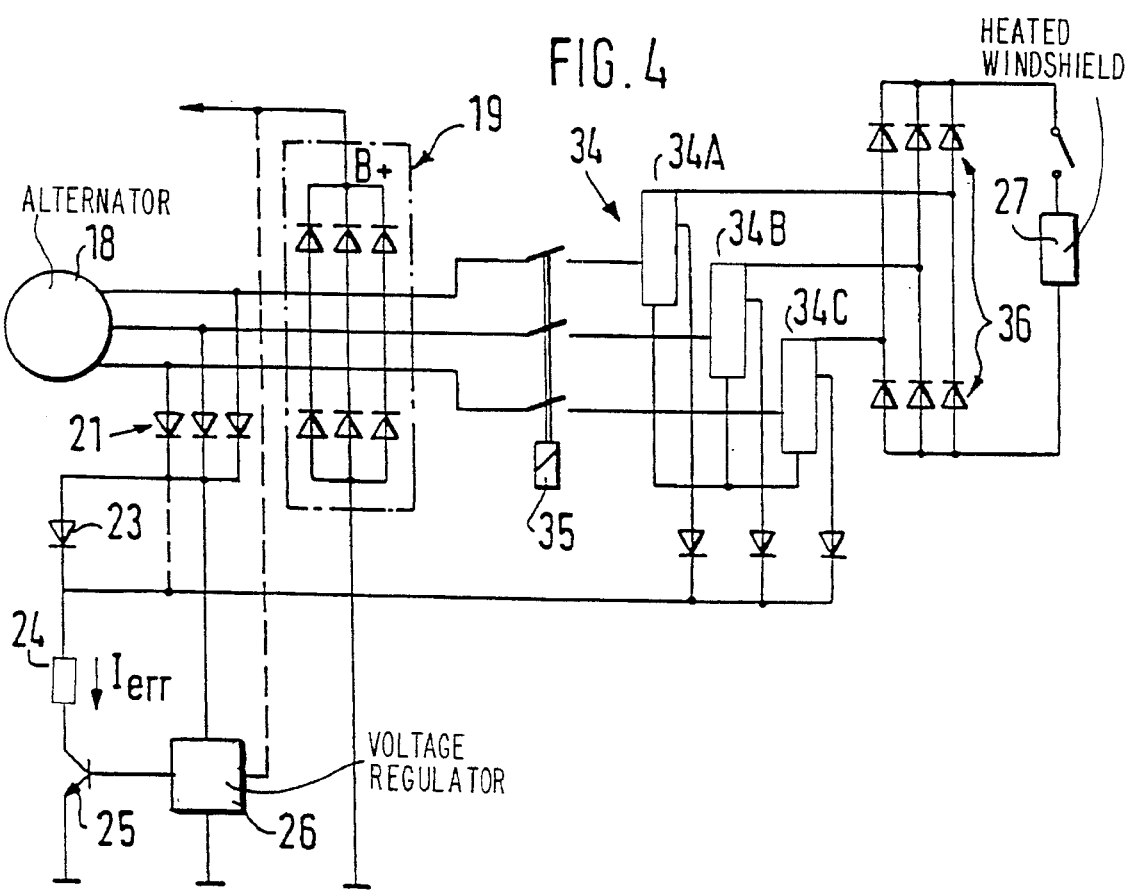

FIG. 4 shows an embodiment example in which the increased exciter current is likewise achieved by applying a voltage to the exciter winding 24 which is higher than the vehicle supply voltage. In this case, the higher voltage is obtained with the aid of a transformer 34. Such an expense is cost-effective in principle when a voltage greater than the vehicle supply voltage is required anyway for an electric heated windshield.

In particular, FIG. 4 again shows an alternator 18 which is connected with the vehicle supply system via a rectifier bridge 19 with the terminal B+. The other side of the rectifier bridge 19 is connected to ground. The exciter winding 24 is connected with the final stage 25 of the regulator via exciter diodes 21 and a diode 23. The final stage 25 of the regulator is connected to ground and with the regulator 26, the latter being connected in addition to the exciter diodes 21.

The windings of the transformer 34 can be connected to the alternator 18 via a relay 35. These windings 34A, 34B, 34C are connected with the heated windshield 27 via an additional rectifier system 36. Additional taps of the transformer windings 34A, 34B and 34C lead directly to the exciter winding 24 via the diodes 37, 38 and 39. In normal operation, the contacts of the relay 35 are opened and the exciter winding 24 is operated at the voltage normally delivered by the alternator.

If an increased output of the alternator is required, e.g. when operating the heated windshield 27, a higher voltage for supplying power to the heated windshield is generated with closed relay 35 in the transformer 34. This transformer 34 could also be replaced with a suitable voltage transformer. A voltage which is increased relative to the vehicle supply voltage is simultaneously applied to the exciter winding 24 via the diodes 37, 38 and 39 so that the current passing through the exciter winding 24 takes on an increased value compared to the nominal exciter current. Since there is a danger of thermal overloading in this case, it must be ensured that the relay can remain closed only for a predetermined time, e.g. several minutes. But an arrangement according to FIG. 2 which is contained e.g. in the voltage regulator 26 can also ensure that the exciter current $I_{Err}$ is reduced by a change in the pulse-duty factor of the voltage regulator when a critical temperature is reached in spite of increased voltage. This prevents a thermal overloading of the regulator or alternator.

A timing circuit which triggers an opening of the contacts after a predetermined period of time can be contained in the relay 35 itself. But this can also be controlled by the voltage regulator 26 via a connection shown in dashed lines in FIG. 4. Compulsory opening is then effected when the temperature measured in the regulator 26 exceeds a limiting value.

If the heated windshield 27 can be uncoupled from the transformer 34 via an additional switch 33, it is also possible to increase the output of the alternator without simultaneous heating operation.

When using a voltage regulator 26 with battery sensing, that is, when the battery voltage is supplied to the regulator 26 via the line shown in dashed lines in FIG. 4, the diode 23 can be omitted. The exciter winding 24 is then connected with the exciter diodes 21 via the connection which is also shown in dashed lines.

An alternator/voltage regulator arrangement in which an increase in the exciter current $I_{Err}$ above the nominal exciter current is not provided, but which is nevertheless improved over the conventional systems, can accordingly be achieved by using a conventional arrangement, but one in which the dimensioning of the individual components is selected in such a way that an overheating could occur under unfavorable circumstances.

To prevent this, the exciter current $I_{Err}$ is reduced when the voltage regulator detects that the temperature at a location of the system increases to an impermissible value.

Figure 5:
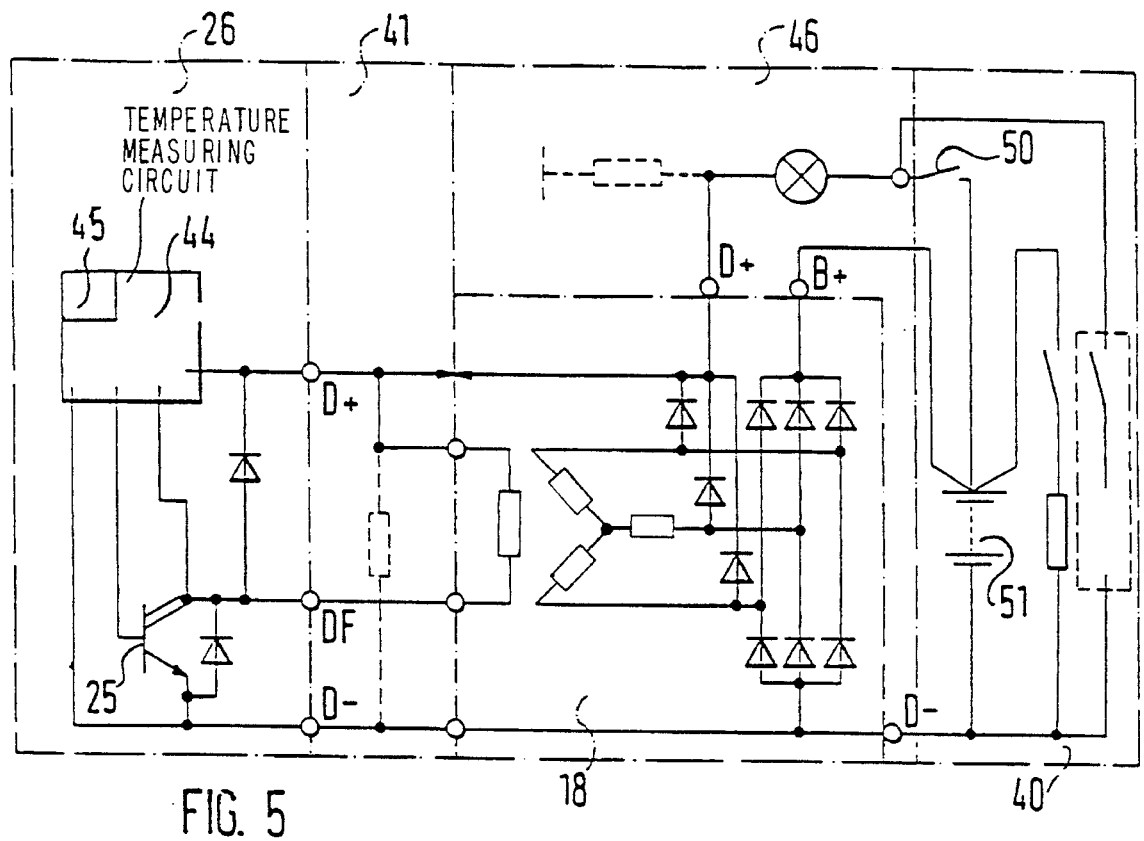
FIG. 5 shows the electrical wiring diagram of an alternator/voltage regulator arrangement in which operation with increased exciter current is not provided, but which is dimensioned in such a way that an excessive temperature could occur under unfavorable circumstances.

Such an alternator/voltage regulator arrangement is shown in FIG. 5. A three-phase alternator which supplies a vehicle supply system 40 with power is designated by 18.

The alternator output voltage is regulated by a voltage regulator 26 which is connected with the three-phase alternator 18 via the brush holder 21. The alternator 18 with terminals D+, B+, DF and D−, the vehicle supply system 40, and the brush holder 41 are constructed in a conventional manner and will not be described in greater detail. The charge indicator light 46, the starter 50, and the battery 51 located between the alternator and ground should also be mentioned.

In a conventional manner, the voltage regulator 26 with the output terminals D+, DF and D contains a switching element, e.g. a switching transistor 25, with a diode 42 which is connected in parallel between the regulator terminals DF and D as well as a freewheeling diode 43 located between DF and B+.

Further, the voltage regulator contains a circuit arrangement 44, not shown in more detail, which is connected between the terminals D+, DF and D as well as to the base and collector of the transistor 25.

The circuit arrangement 44 contains a temperature measurement circuit 45 which measures the temperature of the voltage regulator 26. The circuit arrangement 44 also includes additional auxiliary devices, e.g. for displaying errors, although this can also be effected via the charge indicator light 46 when appropriate.

If the battery temperature is measured, this information can likewise be supplied to the circuit arrangement 44, as can the alternator speed and other optional measurement data.

The circuit arrangement 44 of the voltage regulator 26 can also be constructed as a microprocessor or microcomputer. The required calculations and comparisons of reference and actual values are then effected in this microprocessor while taking into account measured quantities such as the regulator temperature and characteristic values stored in the microprocessor.

The following are stored as characteristic values: characteristic values of the alternator, of the voltage regulator, of the vehicle and characteristic values specific to the devices installed in the vehicle. Limiting temperatures $T_G$ determining permissible heating are also stored. These limiting temperatures can be determined uniformly for the entire system or different limiting temperatures may be determined for different locations of the system.

The operation of the alternator/voltage regulator arrangement according to FIG. 5 is explained with reference to FIG. 6.

Figure 6:
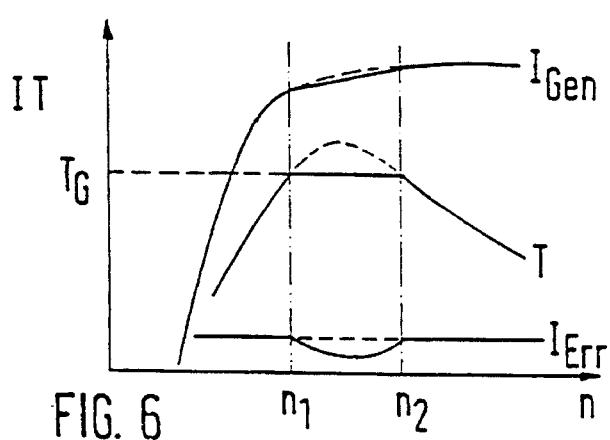
FIG. 6 shows the relationship between the alternator temperature, exciter current and rate of rotation in a system according to FIG. 5.

The alternator current $I_{Gen}$, exciter current $I_{Err}$, and temperature T are plotted over the alternator speed n in FIG. 6. At higher surrounding temperatures, both the alternator temperature and the temperature at another location of the alternator/regulator arrangement can exceed a permissible value of $T_G$ in a speed range between $n_1$ and $n_2$ if no suitable steps are taken. The portion shown in dashed lines in FIG. 6 shows the pertinent undesirable curve.

The stored characteristic values and possible additionally measured quantities, e.g. alternator speed n, are continuously calculated in the circuit arrangement 44 or correspondingly in the microprocessor from the available regulator temperature, regardless of the level of the prevailing temperature at predetermined locations of the alternator/voltage regulator arrangement.

Another possibility for determining temperature consists in that the stationary final temperatures for the components of the alternator/regulator system which are to be protected or which become especially hot are continuously determined and the time curves of the temperatures anticipated at the individual components are plotted from these quantities and the corresponding momentary temperatures prevailing at that time are derived from these curves.

A comparison with the predetermined limiting temperatures for the components in question immediately shows whether or not there is a risk that any of these limiting temperatures will be reached. If applicable, the described steps for reducing the excitation of the alternator can be initiated.

Stationary final temperatures are those temperatures which would occur after a period of approximately 5T (T=time constants) without a change in the conditions (adjusted operating state) prevailing at the beginning of the respective calculation. The stationary final temperatures are determined as a function of the following alternator components:
alternator speed
pulse-duty factor or exciter current or charging current
regulator temperature
alternator voltage Additional components can be evaluated or only some of the quantities mentioned above can be utilized for determining the stationary final temperature.

FIGS. 7a to d show the current and temperature curves plotted over time t, which should serve to clarify the following aspects. The current curve plotted in FIG. 7a includes a load, the lower curve showing an operating state leading to an allowable maximum current I zul and the upper curve showing an operating current which could lead to thermal overloading $I_{Gen}$.

In FIG. 7c, the respective temperature curves are shown in solid lines (allowable T zul at bottom, impermissible T on top). The dotted lines show the respective determined (calculated) stationary final temperatures.

The temperature curves shown in FIG. 7c are shown again in FIG. 7d, which also shows how the temperature curve behaves when the alternator is operated until time t1 in the overexcited state and is then controlled down as a result of reaching the limiting temperature TG so that this limiting temperature is not exceeded. The additional current obtained in this case is shown in the shaded area in FIG. 7b. The allowable thermal extra load is shown in the shaded area in FIG. 7d. The curve of the stationary final temperature which is determined continuously and is maintained at TG after t1 is shown in dotted lines.

The following methods can be used to determine the curve of the temperature change from the determined stationary limiting temperatures or temperature:

1. The heating of a resistor with a measurable TK value, i.e. a temperature-dependent resistor (NTC, PTC) incorporated e.g. in the regulator, is evaluated. Corresponding to the determined stationary final temperature of at least one component which is dependent on the output, the actual temperature curve is plotted from the heating of this resistor, the change in resistance or the temperature of the resistor being evaluated in addition.

2. The heating of a semiconductor junction, e.g. a Zener diode, is evaluated while taking into account the linear relationship between the output P, voltage U and current I.

3. The thermal coupling between the stator and rotor is used. At a determined temperature an exciter current can be exactly associated with each pulse-duty factor. This assignment changes as a function of the temperature so that a statement concerning the average temperature can be made at any desired point in time from the combined values of the exciter current and the pulse-duty factor. This method is particularly advantageous in that it makes use exclusively of quantities which are already available in the regulator in any case.

4. The fact that different cooling air temperatures prevail in the stator of the alternator, but that these can be estimated by taking into account existing thermal ratios, is made use of. The ratios are clarified by the relationships shown in FIG. 8.

FIG. 8 shows the stator 52 of an alternator. The rotor 55 is located in the interior of the alternator and is connected with the fans 57a, 57b via a shaft 54 on which the V-belt pulley 53 is fitted. The voltage regulator 26 is arranged in the interior of the alternator on the side remote of side A. Cooling air is supplied to the interior of the stator via a hose 56 and via the fans 57a, 57b. Depending on the system, the air on side A need not have the same temperature as the air on side B, because the air on the A side is sucked directly out of the engine compartment, while the air on the B side can come either from the engine compartment or via a hose from the outside.

The temperature of the air on side B can be determined directly from the measured regulator temperature, whereas this is not readily possible in the case of the temperature on side A. For this reason, the temperature of the rotor is calculated in the regulator and compared with the average temperature. The third method described above can be used for this purpose. Conclusions are drawn concerning the temperature of the air on side A from the resulting difference and the thermal coupling between the rotor and the components to be protected.

By means of the procedure described in the third and fourth methods, it is possible to determine directly the actual temperature of a component to be protected and to counteract overheating by taking suitable steps.

If such a calculated temperature exceeds one or more predetermined limiting temperatures, the exciter current is reduced by controlling the switching transistor 25 so that the temperature does not exceed the selected limiting value or values. If the temperature drops still lower either because the outside temperature has decreased or because the alternator speed has been increased, the voltage regulator increases the exciter current to its normal value again.

The described measurement of the temperatures at the voltage regulator which is made possible in a simple and inexpensive manner and the temperatures at other locations of the system calculated from this measured temperature correspond to a so-called observer function which is a known regulating technique.

The solid lines in FIG. 6 show the current and temperature curves when the exciter current is reduced according to the invention at excessive temperatures.

A display is effected, e.g. via the charge indicator light, as long as the exciter current is reduced. The display is triggered by the voltage regulator 26 or the microprocessor 44.

In the alternator/voltage regulator arrangement according to FIG. 5, the structural component parts of the alternator are designed in such a way that excessive temperatures could occur under unfavorable conditions. For example, the cross section of the windings can be smaller than normal, the dimensioning of the cooling fan can be reduced, or the construction of the cooling members or heat sinks can be simplified so as to enable an overall saving of material and weight.

The described possibilities for determining the different temperatures can also be used in conventional alternator/voltage regulator systems if necessary. In so doing, it is possible to derive the alternator output voltage required for optimal battery charging from the measured regulator temperature.

Of course, the devices in FIGS. 2 to 5 can be combined so that the temperature can also be calculated by a microprocessor for the devices according to FIGS. 3 and 4, while taking into account stored characteristic values or measurements. It is also possible to determine the temperature by way of stationary final temperatures, possibly by means of the arrangement shown in FIG. 7, in all of the aforementioned embodiment examples. A display can also be effected in these devices when the exciter current is reduced.

It will be understood that each of the elements described above, or two or more together, may also find a useful application in other types of constructions and methods differing from the types described above.

While the invention has been illustrated and described as embodied in a device and a method for regulating an alternator, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A regulatable alternating device, comprising an alternator having an exciter winding; a voltage regulator which includes means for regulating an output voltage of said alternator by influencing its exciter current and has means for detecting temperature of said voltage regulator; means for determining a final temperature of at least one predetermined component of the device, which final temperature occurs in stationary operation, and determining at least one of a temperature curve and an actual temperature of the component as a function of the final temperature and comparing it with the limiting temperature; and means for reducing the exciter current when at least one of a limiting temperature and a limiting temperature range is reached.

2. A regulatable alternating device as defined in claim 1, wherein said means for reducing the exciter current is formed as said voltage regulator.

3. A regulatable alternating device as defined in claim 1, wherein said means for reducing the exciter current is formed as additional means for influencing the exciter current.

4. A regulatable alternating device as defined in claim 1, wherein said alternator is formed so that the limiting temperature can be impermissible at said alternator or at other parts of the device during at least one of intensive loading and high outside temperature at low alternator speeds.

5. A regulatable alternating device as defined in claim 1, wherein said means for determining a final temperature include computing means which determine at least a stationary final temperature as a function of at least one of stored values and measured values.

6. A regulatable alternating device as defined in claim 1, wherein said means for determining a final temperature is formed so that at least one of a momentary temperature and a curve of the temperature over time is determined from the final temperature in stationary operation in order to determine whether or not the limiting temperature is reached.

7. A regulatable alternating device as defined in claim 1, wherein said exciter winding has resistance with a value which is lower than a value which does not lead to thermal overloading of at least one of said alternator and said voltage regulator even under unfavorable circumstances.

8. A regulatable alternating device as defined in claim 1, wherein said alternator has control parameters which are fixed so that a voltage which is increased over the output voltage is produced and fed to said exciter winding so as to increase an output of said alternator.

9. A regulatable alternating device as defined in claim 1, wherein said means for reducing the exciter current include a pulse width modulation stage which has a comparator and an oscillator and influence a pulse-duty factor of said regulator.

10. A regulatable alternating device as defined in claim 9; and further comprising means forming a sum signal from a temperature of said regulator and feeding a sum signal to said pulse width modulation stage as an input signal.

11. A regulatable alternating device as defined in claim 10, wherein said pulse width modulation stage is formed so that it supplies an output signal only when the sum signal exceeds a threshold value of said comparator.

12. A regulatable alternating device as defined in claim 1, wherein said alternator has control parameters which are fixed so that it operates with freewheeling voltage for generating a voltage which is increased over a vehicle supply voltage.

13. A regulatable alternating device as defined in claim 12; and further comprising a transformer which generates the voltage which is increased over the vehicle supply voltage.

14. A regulatable alternating device as defined in claim 12; and further comprising a voltage converter generating the voltage which is increased over the vehicle supply voltage.

15. A regulatable alternating device as defined in claim 12, wherein said alternator operates so that the voltage which is increased over the vehicle supply voltage is applicable to said exciter winding only for a predetermined period of time.

16. A regulatable alternating device as defined in claim 1; and further comprising means effecting a display when at least one of a limiting temperature is reached and the exciter current is reduced.

17. Claim 1, wherein said means for detecting temperature include a computing device in which required characteristic values are stored, to which required measured values are fed, and in which required calculations are affected.

18. A regulatable alternating device as defined in claim 2, wherein said means for influencing the exciter current is formed so as to evaluate at least one of characteristic values of said alternator, characteristic values of said voltage regulator, characteristic values of a vehicle and stored characteristic values related to specific installations in the vehicle for calculating the temperature at predetermined locations in the device.

19. A regulatable alternating device as defined in claim 18, wherein said voltage regulator continuously determines signals which are incorporated in calculations of the temperature at the predetermined locations.

20. A regulatable alternating device as defined in claim 19, wherein said voltage regulator continuously determines the signals of a temperature of said voltage regulator and speed of said alternator, which are incorporated in the calculation of the temperature at predetermined locations.

21. A regulatable alternating device as defined in claim 1, wherein said means for reducing the exciter current operates so that the limiting temperature is the temperature at which no error functions are to be expected and different limiting temperatures are determined for different locations of the device.

22. A regulatable alternating device as defined in claim 1, wherein said means for detecting temperature measure a temperature of said voltage regulator; and further comprising computing means in which a temperature of other selectable locations of the system is calculated from the temperature of said voltage regulator.

23. A regulatable alternating device as defined in claim 22, and further comprising observing means for detecting the temperature.

24. A regulatable alternating device as defined in claim 1; and further comprising a temperature-dependent resistor such that the temperature curve over time is formed by evaluating a change in at least one of resistance and temperature of said temperature-dependent resistor as a function of a determined value of the final temperature in stationary operation.

25. A regulatable alternating device as defined in claim 1; and further comprising a semiconductor junction formed as a Zener diode, such that the temperature curve over time is formed by evaluating a heating of said semiconductor junction as a function of a determined value of the final temperature in stationary operation.

26. A regulatable alternating device as defined in claim 1, wherein said alternator has a rotor and a stator with thermal coupling therebetween so that the temperature curve over time is formed by evaluating said thermal coupling.

27. A regulatable alternating device as defined in claim 1; and further comprising a fan arranged so that different cooling air temperatures at a side of said fan and at a side remote from of said fan are taken into account.

28. A regulatable alternating device as defined in claim 1, wherein said means for determining a final temperature determine the temperature curve for different components.

29. A method of regulating an alternator with an exciter winding, comprising the steps of regulating an output voltage of the alternator with a voltage regulator by influencing an exciter current of the alternator; detecting a temperature of the voltage regulator; determining a final temperature of at least one predetermined component of a device, which temperature occurs in stationary operation; determining at least one of a temperature curve and an actual temperature of the component as a function of the final temperature and comparing it with the limiting temperature; and reducing the exciter current by additional means for influencing the exciter current.

* * * * *